May 18, 1948.    J. F. WERDER    2,441,681
OIL FILTERING APPARATUS
Filed Oct. 16, 1943
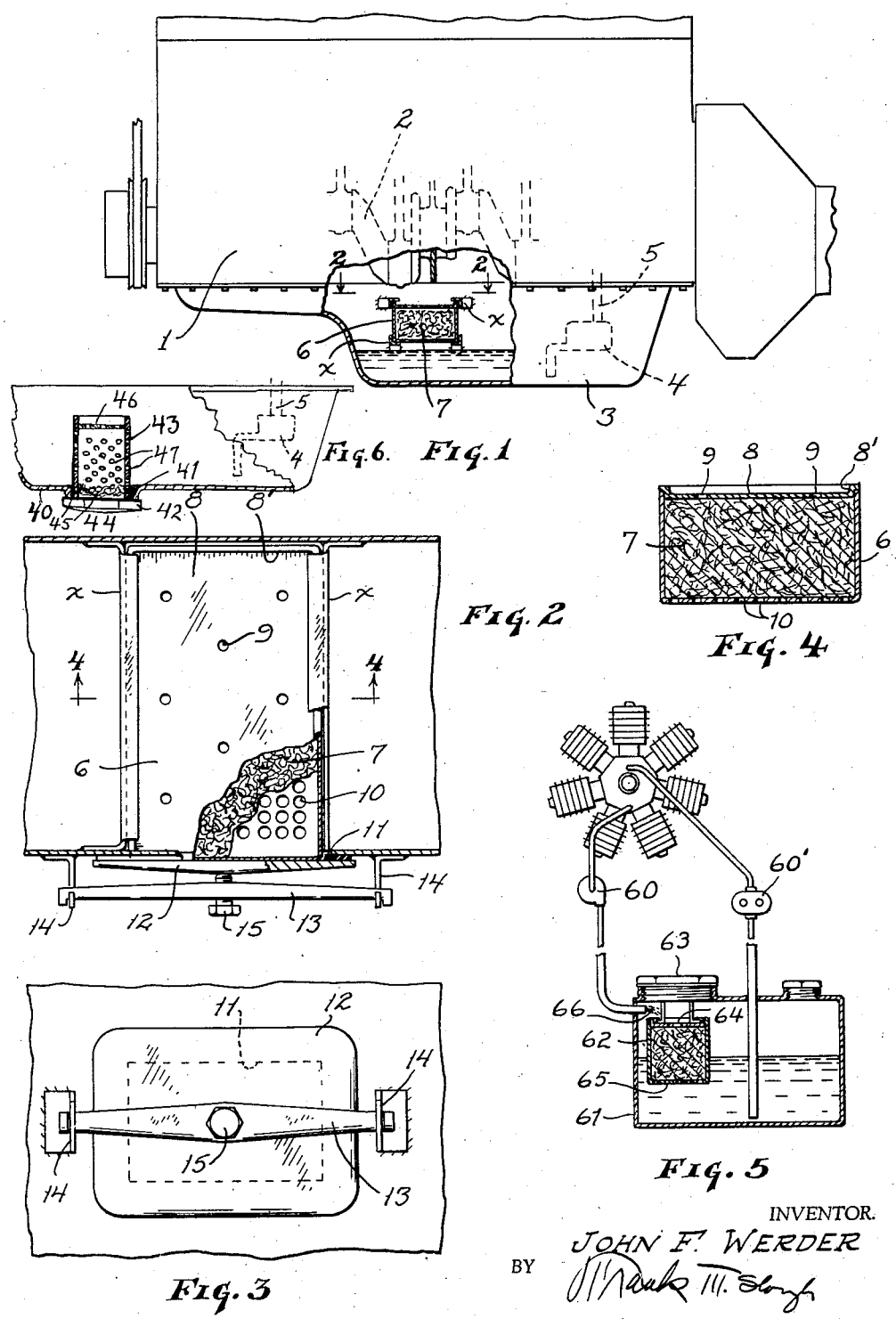
INVENTOR.
JOHN F. WERDER Patented May 18, 1948

2,441,681

UNITED STATES PATENT OFFICE 2,441,681

OIL FILTERING APPARATUS

John F. Werder, Cleveland, Ohio; Frances Keller Werder, executrix of said John F. Werder, deceased, assignor to The Zip Abrasive Company, Cleveland, Ohio, a corporation of Ohio Application October 16, 1943, Serial No. 506,599

1 Claim. (Cl. 184—6)

My invention relates to improvements in internal combustion engines and more particularly to improvements in purifying oil used in such engines.

It is one of the objects of my invention to provide a filter for the oil which is pumped from an oil reservoir to various bearings of the crank shaft and connecting rods and passed from the crank case back into the oil reservoir, said filter being internally disposed within the oil pan and purifying the oil whereby the life of the various parts of the motor is greatly prolonged.

Another object of my invention is to provide a filter of the type described so positioned and accessible as to materially reduce the servicing time on internal combustion motors.

Another object of my invention is to provide an improved filter of the type described which will not in any way interfere with the normal circulation of oil from the sump to the bearings.

Another object of my invention is to provide a filter of the type referered to which will not affect the temperature of the oil.

Another object of my invention is to provide an improved filter of the type described which will catch any foreign matter such as dirt or particles of oil.

Another object of my invention is to provide a filter of the type described whereby a portion of the oil is circulated through the filtering element by gravity, keeping the oil clean and thereby increasing the life of the motor.

Another object of my invention is to provide a filter of the type described adapted for use in motors having force feed lubrication.

A further object of my invention is to provide a filter of the type described whereby the pressure or heat on the oil flowing through the filter element is substantially uniform at all times.

Another object of my invention is to provide a filter of the type described whereby the oil is cleaned almost as soon as the motor is started.

Another object of my invention is to provide a filter of the type described which will be inexpensive to manufacture and highly efficient and economical in use.

Other objects of my invention and the invention itself will become increasingly apparent from the following description and drawings, in which drawings:

Fig. 1 is a side plan view of an internal combustion engine with a portion thereof shown as broken away in order to show the improved filtering device of my invention in cross section;

Fig. 2 is a sectional view to a relatively larger scale taken on the line 2—2 of Fig. 1 and with a portion of the type filter container casing and a portion of the filter material within the casing being shown as broken away to respectively expose some of the filter material and the lowermost plate of the casing and the more numerous apertures of said lower plate as compared with those of the upper plate;

Fig. 3 is a side elevational view of the cover plate and securing means therefor for the oil pan of Fig. 2;

Fig. 4 is a sectional view taken on the line 4—4 of Fig. 2;

Fig. 5 is a cross sectional view of an oil tank adapted for use in airplane motors, a further embodiment of the oil filter of my invention being applied thereto, and Fig. 6 is a view of the same character as that of Fig. 1 of another embodiment of my invention, the view being partially in section and partially in elevation, a portion thereof shown as broken away in order to more clearly disclose this embodiment.

Referring now to the drawings and particularly to the form of my invention illustrated in Fig. 1, at I I show the crank case of an internal combustion engine, within which is mounted the crank shaft illustrated in dotted lines at 2, Fig. 1, an oil pan 3 being secured to the bottom of the crank case, and a pump 4 being connected by circulating tubes 5 to the crank shaft 2 whereby oil is sprayed by the usual force feed system on the cylinder walls and piston pins, as is well understood in the art.

For many years, filters of various types have been employed externally on gasoline or Diesel engines for the purpose of removing foreign matter from the oil. These have generally consisted of felt or cloth filtering elements or units mounted on the engine or on the engine side of the dashboard. Inlet and outlet pipes were then connected from this container to the pressure oil line and crank case respectively whereby a small portion of the oil being circulated through the motor was pumped through the filter by means of this bypass and returned to the crank case.

These have generally proven unsatisfactory, for in all motors having force feed lubrication a pressure relief valve is enclosed in the system so that when the desired pressure has been built up, the excess is returned to the oil pan. When the motor is started, the oil is cold, and particularly in winter starting, the pressure is much higher than when the oil is thinned out due to heat, and thus in such a filter, even with the relief valve to relieve excess pressure, the oil pressure is considerably higher with cold oil than after the oil has become heated.

The filter of my invention as shown at 6 is a filter employed internally of the oil pan, said filter occupying but a small area of said pan and therefore not interfering in any appreciable manner with the flow of the oil therein and the pumping of the oil therefrom according to a force fed system of lubrication.

In the form of my embodiment shown in Figs. 1 to 4 inclusive, a plurality of angle iron pieces, preferably four in number, as indicated at X, hold the filter cartridge 6 of my invention in position within the oil pan 3, said cartridge being filled with waste, felt, cloth or other suitable material, as indicated at 7. The cartridge of the embodiment of my invention is preferably generally rectangular in form and has a cover plate 8 secured thereto. Said cover plate 8 is preferably provided with a plurality of apertures 9 whereby a small quantity of oil is permitted to filter through the material within the cartridge, which oil leaves the cartridge 6 by means of a plurality of apertures 10 disposed in the bottom of the said rectangular cartridge, the number of apertures disposed in the bottom of said cartridge being greater than the number of apertures provided in the cover plate 8 whereby an excess of oil does not enter the filter element at any time but the flow of which is controlled by a relatively small number of apertures whereby it may be effectively filtered and any such oil which is passed through the filtering medium is unhindered in leaving the cartridge by the relatively greater number of holes provided in the bottom of said unit. Also, any excess oil other than the layer between the cover and the top of the head will run off to the outside of the filter.

The cover 8 is not necessarily essential to the operation of the filter, however, and the top of the filter cartridge may be left open or covered with a screen, as desired. It is to be noted that in the form of my invention shown in Figs. 1 to 4 inclusive a rectangular opening 11 is disposed at the side of the oil pan whereby the filter may be inserted through the opening and a cover 12 placed over said opening, said oil pan cover 12 being retained upon the oil pan by means of an arm or handle 13 secured to the pan by means of lugs 14, a screw 15 being disposed centrally of the handle and being adapted to tightly engage the cover 12 whereby the same is retained securely in place over the opening 11. When it is desired to replace the cartridge or the material within the cartridge, it will only thus be necessary to loosen the screw 15 and to remove the arm 13 from the two lugs 14; the cartridge 6 can then be slid outwardly through the opening 11. A new cartridge may then be inserted or the cover 8 may be removed and new waste material substituted for the old.

The embodiment of Figs. 1 to 4 inclusive has been shown in connection with an in-line motor having an attached oil pan. It will be obvious however, that my invention is susceptible of other uses such as, for example, in radial airplane motors as shown in Fig. 5. This figure shows the application of my invention to an airplane motor of the radial type wherein sufficient room is not present in the crank case to incorporate the improvements of my invention, as disclosed heretofore, in connection therewith. This type of airplane motor usually employs two pumps, one of which is called a scavenger pump, as shown at 60, which pumps the surplus oil out of the crank case as fast as it is thrown off the pistons, bearings, etc., and throws it into an oil tank as shown at 61. The second oil pump 60' then pumps the oil from the tank to the motor bearings.

I preferably place the improved filtering element 62 of my invention in the oil tank similarly to the manner in which I have placed it within the oil pan in the other embodiment of my invention. I preferably employ the embodiment illustrated in Fig. 5 in connection with airplane motors and in this form the filtering container 62 is suspended from the top of the oil tank through the cap 63 whereby a portion of the discharged oil from the scavenger pump is trapped in the filtering container 62 and purified as it works its way into the balance of the container, entering said container through apertures 64 and leaving the same through a plurality of apertures 65, which outlet holes 65 exceed in number the number of inlet holes 64 disposed in the top of said container. Hence, a portion of the oil is circulated through the filtering element by gravity and the oil is kept clean and the life of the motor is greatly increased.

Fig. 6 illustrates another embodiment of my invention wherein a foraminous container 43, the upper part of which is shown in vertical diametrical section and the bottom thereof being of enlarged hexagonal form, is shown in elevation.

The portion of the cylindrical wall of the container 43 adjacent the base 42 is exteriorly threaded to cooperate with the interior threads of a flanged opening through the bottom wall of the crank case 40 for threading the entire container upwardly with the aforesaid interengaging threads cooperating to secure the container in place, as illustrated. An annular gasket 45 is preferably interposed between the upper surface of the laterally extending base 42 and the end surface of the pendant threaded flange of the crank case to seal the joint against the escape of lubricant.

The container 43, like that illustrated in Figs. 1, 4 and 5, is normally filled with filtering material, such as that shown at 7 in Figs. 1 and 4, and a small portion of which only is indicated at 45 in the bottom of the container 43, the view being taken with most of the filtering material removed so as to expose the openings 47 through the opposite lateral wall of the container.

The operation of the embodiment of Fig. 6 is the same as that shown in Fig. 1 the only difference being in the operation whereby the container is inserted within or removed from the lower crank case wall. In fact, the container 43 is in the form of a plug type cartridge, the oil pump and conduit system, indicated by the numerals 4 and 5, is the same as that previously described with reference to the embodiment of Figs. 1 to 4 inclusive and the container of Fig. 6 is, by nature of its placement and removal, akin to the embodiment illustrated in Fig. 5.

Although I have shown in Fig. 6 the plug and crank case opening flange as having cooperating threads, I am aware that a bayonet joint between the crank case aperture walls and said container base plug may be substituted therefor whereby equivalent results may be secured.

In my invention, however the particular embodiment thereof is constructed, it is to be noted that the filter is always placed within the oil reservoir whereby the oil is accumulated to make a slight head of pressure to assist in running the oil through the filtering medium, a certain portion of the oil dropping from the running parts of the motor being purified constantly during the operation of the motor and oil droppage therefrom. The filter elements which have been shown in some cases have been made removable and in other cases are not as readily removed from the oil pan or tank.

It will further be appreciated that numerous and extensive departures may be made from the various embodiments herein illustrated without departing from the scope of the invention and the appended claim.

I claim:

In an internal combustion engine, a crank case into which oil will drop from the bearings of the crank shaft and connecting rods, a foraminous container removably secured within the said crank case having an upwardly presented oil receiving mouth with said mouth disposed in the path of only a minor fractional part of the oil descending from the engine to the crank case, the inlet end of an oil pump disposed within the body of oil within said crank case in lateral substantially spaced relation to said container, oil filtering material of restricted pervious quality enclosed within the container whereby oil received by said container is filtered therethrough into the crank case reservoir, the said container being provided with openings which are so formed as to offer relatively much lower resistance to the outflow of oil from the interior of the container than said filter material offers to the flow of oil therethrough.

JOHN F. WERDER.

REFERENCES CITED

The following references are of record in the file of this patent:

UNITED STATES PATENTS

| Number | Name | Date |
|---|---|---|
| 696,919 | Allfree | Apr. 8, 1902 |
| 742,079 | Spuhl | Oct. 20, 1903 |
| 893,964 | Whittemore | July 21, 1908 |
| 1,015,466 | Adams | Jan. 23, 1912 |
| 1,230,470 | Farmer | June 19, 1917 |
| 1,589,883 | Herrman | June 22, 1926 |
| 1,671,391 | Winslow | May 29, 1928 |
| 1,796,531 | Nugent | Mar. 17, 1931 |